Sept. 15, 1970 E. E. KIRKHAM 3,528,745
APPARATUS FOR INCREASING THE FREQUENCY RESPONSE
AND STABILITY OF A LIGHT DETECTION SYSTEM
Filed Dec. 13, 1967 2 Sheets-Sheet 2

INVENTOR.
EDWARD E. KIRKHAM
BY
William C. Gleisner Jr.

United States Patent Office 3,528,745
Patented Sept. 15, 1970

3,528,745
APPARATUS FOR INCREASING THE FREQUENCY RESPONSE AND STABILITY OF A LIGHT DETECTION SYSTEM
Edward E. Kirkham, Brookfield, Wis., assignor to Kearney & Trecker Corporation, West Allis, Wis., a corporation of Wisconsin
Filed Dec. 13, 1967, Ser. No. 690,130
Int. Cl. G01b 9/02; G01j 1/32
U.S. Cl. 356—106
1 Claim

ABSTRACT OF THE DISCLOSURE

A method of increasing the frequency response and stability of a light detection system responsive to a pulsating light input signal. Upon variations in the intensity of the light input signal a photodetector actuated thereby provides a voltage command signal and a feedback signal operative to modify the total input light to the photodetector.

BACKGROUND OF THE INVENTION

The present invention relates to optical-electronic systems which utilize a photodetector to provide an operating command signal in response to a sinusoidal light input signal.

Although the photodetector has many uses in industry today, one use is in interferometric devices for making precise measurements between relatively movable members. The prior art teaches the general principles of interferometry both with respect to precisely measuring distances by counting interference fringe patterns, and producing phase differentiated portions within those fringe patterns to determine the direction of movement.

In general, interferometric devices function on the basis of the amplitude of a light beam. To accomplish amplitude division, there is provided a semi-transparent partial reflector for dividing entrant light from a light source into two split light beams. One of the split light beams is then directed over a fixed length to a stationary reflector and then returned to the partial reflector. Concomitantly therewith, the other split beam is directed over a measuring path of variable length to a remotely positioned, relatively movable light reflector and then likewise returned to the partial reflector for recombining with the fixed length reference beam to develop interference patterns or light fringes in a single wave front. As known in the art, the light source, beam splitting partial reflector, and reference beam reflector are mounted in fixed relationship on one member and are relatively movable to the spaced apart measuring beam reflector.

Photodetector means are used with other electronic components to electrically count the interference fringes from the partial reflector. The number of interference fringes counted by the photodetector and the rest of the electronic circuitry indicates the extent of movement between the partial reflector and measuring beam reflector. The electronic circuitry associated with an interferometer usually consists of a pair of photodetectors, each followed by an amplifier and a Schmitt trigger which is used to drive a reversible counter. This circuitry must not have excessive drift and it must have adequate frequency response. The requirement of frequency response presents no problem except for the photodetector.

Although interferometers have been installed on machine tools to measure rectilinear movement between different machine tool movable elements, accurate light fringe counting requires that the top speed of these machine tool elements be limited to ensure that the frequency response of the photodetector is adequate so as not to miss counting any light fringes. The frequency response of present day photodetector electronic counting systems limit the maximum speed which the movable machine tool element can be moved, to about four inches per second. It would be desirable to use this type of interferometer measuring device on machine tool movable elements moving at speeds greater than four inches per second.

SUMMARY OF THE INVENTION

According to this invention, there is provided in an optical-electronic system using a photodetector, a means of supplying optical feedback to the photodetector for maintaining a uniform input light thereto for improving the frequency response and stability of the whole system.

The optical feedback may be accomplished by adding light to the photodetector from an auxiliary light source. The auxiliary light source is biased to be always emitting some amount of light. As the input signal light varies in intensity, the auxiliary light also varies in intensity, but in the opposite direction to keep the total light intensity entering the photodetector essentially constant. The light entering the photodetector is turned into a voltage by producing or controlling an electric current. This voltage is added to a bias voltage of opposite polarity and the sum of these voltages is fed into an amplifier. The output of the amplifier is fed back to the auxiliary light source as well as to the Schmitt trigger. This feedback will tend to keep the voltage output of the photodetector at essentially the same amplitude thus increasing the frequency response and stability of the whole optical-electronic system.

Another means of supplying feedback to an optical-electronic system is by modulating the input signal light thereto. A polarized input light signal is passed through a Kerr cell and thence through a polarizer which is predeterminately rotated to emit a selected portion of the input light signal. The emitted portion of the light signal is transmitted to a photodetector and the output of the photodetector is connected to an amplifier. The output of the amplifier is fed back to the Kerr cell in a manner so as to effect the operation of the Kerr cell according to the strength of the input signal wave. That is, when the input signal increases in intensity, the voltage to the Kerr cell will act to rotate the plane of polarization to decrease the percentage of the light flux emitted from the second polarizer, thereby keeping the total light flux on the photodetector essentially constant. On the other hand, when the input signal intensity decreases the voltage signal from the amplifier to the Kerr cell will act to rotate the plane of polarization in a reverse direction so as to increase the light flux emitted from the second polarizer, thereby tending to keep the total light flux on the photodetector essentially constant.

It is the general object of this invention to provide an optical-electronic system using a photodetector with improved frequency response and stability.

It is a further object to provide optical negative feedback to a system using a photodetector.

Another object of the invention is to apply optical feedback to an optical electronic system by the use of an auxiliary light source.

Still another object of this invention is to apply optical feedback to an optical-electronic system by modulating the signal light.

Still another object of this invention is to increase the response of present-day interferometer measuring systems used on movable machine tool elements to allow for moving these movable elements at higher speeds.

The foregoing and other objects of this invention, which will become more fully apparent from the following detailed description, may be achieved by the exemplifying apparatus depicted and set forth in the specification in connection with the accompanying drawings.

DESCRIPTION OF THE DRAWINGS

FIG' 3 is a schematic drawing of an optical-electronic system including a supplemental light source which feeds light to the photodetector to increase the frequency response and stability of the whole system.

DESCRIPTION OF THE PREFERRED EMBODIMENTS

Figure 1:
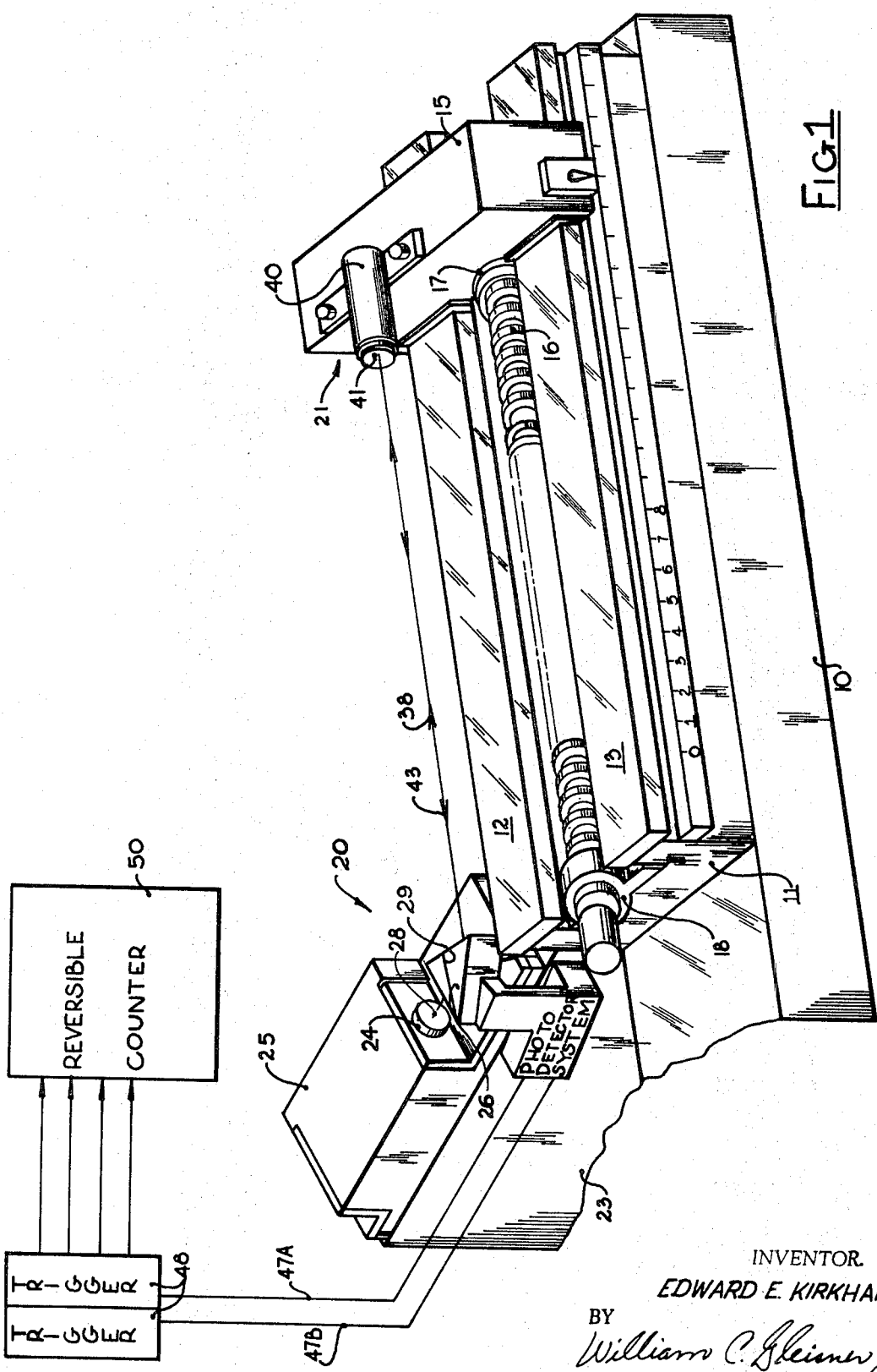
FIG. 1 is a fragmentary schematic perspective view of a machine tool table arrangement, illustrating an interferometric measuring system which embodies the use of the present invention.

Referring now to the drawings, and more specifically to FIG. 1 thereof, a machine tool table arrangement is shown that embodies a length measuring interferometer which incorporates the use of the present invention. The machine tool table arrangement comprises essentially a base 10 formed with an integral base portion 11 provided with spaced apart, longitudinally extending ways 12 and 13. A movable table 15 is provided with complementary way surfaces maintained in slidable engagement with the way surfaces 12 and 13 for rectilinear, longitudinal movement therealong. To accomplish this, there is provided the usual translating mechanism comprising a rotatable screw 16 journalled toward one end within a bored opening formed in a transverse web 18 of the base portion 11 and constrained thereby against axial movement. Toward its opposite end, the translating screw 16 is maintained in threaded engagement with a cooperating nut 17 secured to the underside of the movable table 15. Thus, rotation of the screw 16 by a motor (not shown) in well-known manner operates to effect longitudinal movement of the machine tool table 15 along the guiding ways 12 and 13 in either direction.

For determining both the direction and extent of movement of the movable table 15, an interferometric measuring system is used. The interferometric measuring system comprises an optical assembly 20 and a relatively movable reflecting optical assembly 21. The optical assembly 20 is fixedly secured to an angularly extending base sction 23 integrally formed with the main machine base 10. The optical assembly 20 includes a laser 24 having a housing 25 that is secured directly to the base section 23, in a position to project an intense light beam 28 toward a side face of a unitary prismatic element 26, fixedly secured to a forwardly extending portion of the housing 25.

Figure 2:
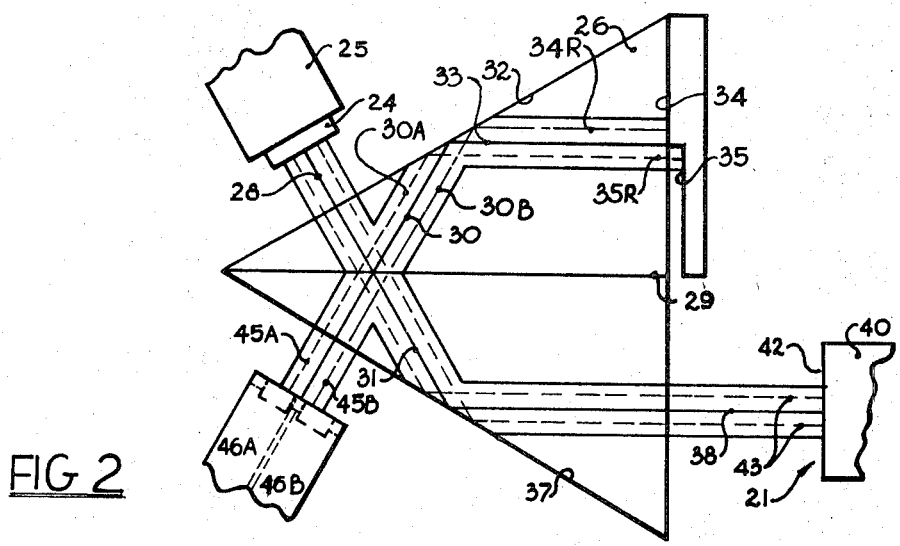
FIG. 2 is a plan schematic view of the cooperating relatively movable prismatic elements.

As shown in FIG. 2, the unitary prismatic element 26 is retained in fixed relationship to the laser housing 25 in a manner that the lightbeam 28 emanating from the laser 24 is transmitted via a side face to a semi-transparent interface 29 positioned in perpendicular relationship to the base. The semi-transparent interface 29 is partially reflective to act as a beam splitter for dividing the entrant light beam 28 from the laser 24 into two split light beams 30 and 31, and for recombining the beams.

The reflectively split light beam 30 continues internally and is reflected by internal reflective surface 32 as indicated by the axial line 33. The beam 33 is reflectively returned by adjacent, internally stepped reflective surfaces 34 and 35. To provide a phase differentiated step in the internal beam, the internal reflectors 34 and 35 are spaced apart one eighth light wave length. As a result, the beam 33 is reflectively returned coincidentally as two quarter phase displaced measuring beam portions 34R and 35R. These continue from the internal reflective surface 32 as two adjacent reference beam portions 30A and 30B for recombining with the reflectively returned measuring beam 31 at the semi-transparent interface 29.

The other of the split light beams 31 is transmitted by the beam splitter 29, reflected by an internal reflective surface 37, and directed outwardly from the prismatic element 26 along a light beam path 38 to constitute a measuring beam. The measuring beam reflecting optical assembly 21 comprises a tubular housing 40 that is fixedly secured directly to the movable machine member 15. A mirror 42 is secured within a bored opening formed in the housing 40 in such manner to constitute a reflector for the lightbeam 38 directed outwardly from the prismatic element 26. A reflected beam 43 from the mirror 42 is directed along a pathway concidental to the beam 38 to the prismatic element 26. The reflected beam 43 is combined with the reflectively returned internal reference beam along the semi-transparent prism interface 29. In the resulting separate fields of illuminations, separate sets of fringe patterns are provided in the recombined beam portions 45A and 45B for respectively activating the separate photodetector units 46A and 46B. The interference fringes generated provide information as to the direction and distance table 15 and the optical assembly 21 have moved. The value of each fringe generated by the interferometer represents approximately twelve millionths of an inch travel of the table 15. These fringes are counted by a reversible counter. The fringes coming from the beam splitter 29 of the prismatic element 26 are in the form of pulsating light waves, and are converted into electrical sinusoidal waves by the photodetector units 46A and 46B. From the photodetector units 46A and 46B the sinusoidal waves are carried by conductors 47A and 47B respectively to a set of triggers 48 which convert the sinusoidal waves to square waves operative to actuate a reversible counter 50, as schematically shown in FIG. 1.

The present invention is directed to improving the operating response of a photodetector to a pulsating light signal, and particularly to improving the response of the photodetector units 46A and 46B in an interferometer. The input to the respective photodetector units 46A and 46B constitute sinusoidal light waves in quadrature spaced relationship. Consequently, the output of each photodetector is a sinusoidal voltage. As the rate of movement of the table 15 increases in speed, the frequency of the incoming sinusoidal light wave signals and the frequency of the outgoing sinusoidal voltage from the photodetectors will increase. If the speed of the moving table 15 is less than four inches per second, each photodetector provides a sinusoidal output voltage whose amplitude is of sufficient magnitude to operate the reversible counter. Likewise at table speed of less than four inches per second, each photodetector has a frequency response which enables it to the follow the amplitude and frequency changes of the respective sinusoidal incoming light waves from the beam divider 29 of the prismatic element 26. At higher table speeds, a photodetector does not have the frequency response necessary to respond accurately to the true amplitude of the incoming light wave signals, and the amplitude of its output command voltage drops as the speed of the table increases. As a result, the photodetectors 46A and 46B are not accurate in operating the counter 50 and thereby given an inaccurate fringe count. This invention allows the table 15 to move at speeds considerably greater than four inches per second, and the photodetector units 46A and 46B accurately count all of the light interference fringes from the interferometric measuring system.

Figure 3:
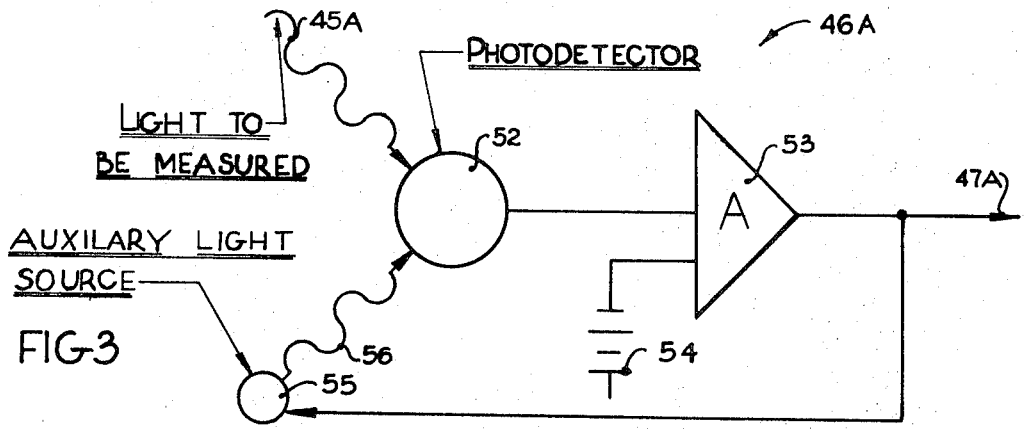

Inasmuch as the photodetector units 46A and 46B are identical, only one will be described in detail with the understanding that the other is exactly the same in its mode of operation excepting that it provides a quadrature phase displaced voltage output signal. FIG. 3 illustrates that a photodetector unit is comprised of a photodetector 52, an amplifier 53, a battery 54, and an auxiliary light source 55. Optical negative feedback may be effected by adding light to the photodetector 52 from the auxiliary light source 55. With no incoming signal light 45A coming from the prismatic element 26, the only light affecting the photodetector 52 is the light 56 coming from the auxiliary light source 55. The auxiliary light source 55 is always emitting some light due to the biasing of a battery 54. The output from the battery 54 is fed into an amplifier 53, and the output therefrom is, in turn, fed back to the auxiliary light source 55. The light 56 from the auxiliary light source 55 actuates the photodetector 52 to provide a positive output voltage which is transmitted to the amplifier 53 and added to the voltage of opposite polarity transmitted thereto from the battery 54. The sum of these two voltages is amplified by the amplifier 53. As the sinusoidal input light signal 45A is turned on, or is increased in intensity, the positive output voltage from the photodetector 52 is correspondingly increased, as is the positive polarity voltage to the amplifier. The parameters of the circuit are set up such that the bias voltage of the battery 54 is such that the positive voltage from the photodetector 52 will always be less than the negative battery voltage. This means that there will always be a voltage of negative polarity being fed into the amplifier 53. As the signal light 45A increases in intensity the difference between the voltage from the photodetector 52 and the battery 54 will decrease. This will effect a smaller input to the amplifier 53 and therefore a smaller output voltage to be fed back to the auxiliary light source 55. On the other hand, when the signal light 45A decreases in intensity the difference between the voltage from the photodetector 52 and the battery 54 will increase. This will effect a larger input voltage to be applied to the amplifier 53 and therefore a larger output voltage is fed back to the auxiliary light source 55. Therefore, as the signal light 45A varies in intensity, the intensity of light from the auxiliary light source 55 also varies inversely in intensity to maintain the total light intensity entering the photodetector 42 substantially constant. This negative light feedback will tend to keep the voltage output of the photodetector 52 at the same amplitude, thus increasing the frequency response and stability of the whole optical-electronic system.

Figure 4:
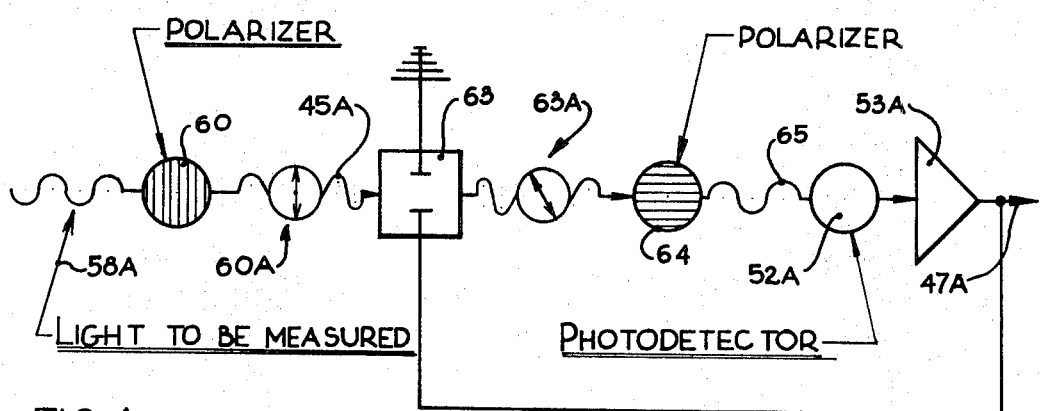
FIG. 4 is a schematic drawing of a modified form of the invention in which feedback control operates to modulate the input signal to improve the frequency response and stability of the optical-electronic system.

FIG. 4 illustrates a modified form of the invention by which optical negative feedback may be affected by modulating the input signal light 45A to the photodetector 52A. In the event a laser light source is not provided in the interferometer, however, a sinusoidal input signal light 58A is first passed through a polarizer 60 to effect a change in the ordinary light to plane-polarized light as graphically indicated at 60A. This step would not be necessary if the input signal light 58A is provided by a laser light source, since the light waves from a laser are already plane-polarized. For simplicity in FIG. 4, the output beam from polarizer is identified as 45A, corresponding to the input beam in FIG. 3. The polarized light beam 45A, FIG. 4, is now transmitted through a Kerr cell 63. From the Kerr cell 63 the light beam passes through another polarizer 64 which is selectively rotated so as to emit a portion of the light, as graphically indicated at 63A. The emitted portion of light 65 is transmitted to a photodetector 52A and the output therefrom transmitted to an amplifier 53A. The voltage output command signal from the amplifier 53A is fed back to the Kerr cell 63 in such a manner as to effect the operation of the Kerr cell 63 according to the strength of the input signal 58A. That is, when the input signal 58A increases in intensity, the feedback voltage transmitted from the amplifier 53A back to the Kerr cell will act to rotate the plane of polarization to keep the light flux emitted from the polarizer 64 constant, thereby keeping the total light flux on the photodetector 52A constant. Conversely, when the input signal 58A intensity decreases, the voltage signal from the amplifier 53A to the Kerr cell 63 will act to rotate the plane of polarization in a reverse direction in a manner to keep the light flux emitted from the second polarizer constant, thereby keeping the total light flux on the photodetector 52A constant. By keeping the light flux substantially constant, the voltage output of the photodetector 52A is maintained at the same amplitude, thus increasing the frequency response and stability of the whole optical-electronic system.

In both FIGS. 3 and 4, sinusoidal output command voltages are transmitted from the respective amplifiers 53 and 53A, which are likewise connected to supply feedback control to the auxiliary signal controller, which operate on the input light to the photodetectors.

Thus, in both FIGS. 3 and 4, the total light flux at the respective photodetectors there shown is maintained constant irrespective of variations in the intensity of the sinusoidal input light signals.

From the foregoing detailed description of the illustrative embodiment set forth herein to exemplify the present invention, it will be apparent that there has been provided an apparatus for increasing the frequency response and stability of an optical and electronics system, such as the type used in interferometers which are very useful as length measuring devices.

From the above description of a preferred embodiment of my invention, it will be apparent that variations in any of the structures may be made without departing from the spirit and scope of the invention and that the scope of the invention is to be determined from the scope of the following claim.

The principles of this invention having now been fully explained in connection with the foregoing description, I hereby claim as my invention:

1. In an interferometric measuring apparatus comprising:
   a beam divider for splitting an entrant light beam into two beams;
   a light source incident upon said beam divider;
   a reference reflector in fixed relationship to said beam divider for returning thereto one of the split beams as a fixed length reference beam;
   a movable reflector for reflectively returning the other of the split beams as a variable length measuring beam to said beam divider for combining with said reference beam to provide interference fringes in the form of a sinusoidal input light signal;
   power drive means for effecting relative movement between said reference and movable reflectors;
   a photodetector carried in fixed relationship to said beam divider responsive to said input signal and providing an output signal;
   an input signal controller comprising an auxiliary light source directing light of varying intensity toward said photodetector and operative to modify the total input light to said photodetector in accordance with variations in the sinusoidal input light signal; and
   a feedback circuit actuated by said output signal, said feedback circuit controlling said auxiliary light source in a manner to vary the intensity of the light therefrom inversely with respect to the intensity of the sinusoidal input light signal from said system.

References Cited

UNITED STATES PATENTS

| | | | |
|---|---|---|---|
| 2,193,789 | 3/1940 | Braselton | 250—205 |
| 2,842,679 | 7/1958 | Goodwin | 250—205 |
| 3,041,921 | 7/1962 | Pickels et al. | 250—225 X |
| 3,158,674 | 11/1964 | Woodson | 356—106 |
| 3,450,478 | 6/1969 | Sebestyen | 250—225 X |

RONALD L. WIBERT, Primary Examiner

T. MAJOR, Assistant Examiner

U.S. Cl. X.R.

250—205, 217